(12) United States Patent  (10) Patent No.: US 6,545,574 B1
Seymour et al.  (45) Date of Patent: Apr. 8, 2003

(54) ARC FAULT CIRCUIT BREAKER

(75) Inventors: Raymond K. Seymour, Plainville, CT (US); Michael Guerrette, East Bristol, CT (US); Murali Magham, Plainville, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,348

(22) Filed: Dec. 17, 2001

(51) Int. Cl.⁷ ............................................. H01H 83/06
(52) U.S. Cl. ......................................... 335/18; 335/202
(58) Field of Search ......................... 335/18, 132, 202, 335/207, 8–10; 361/42–50

(56) References Cited

U.S. PATENT DOCUMENTS

| | | | |
|---|---|---|---|
| 3,970,975 A | * 7/1976 | Gryctko | ........................ 335/18 |
| 4,568,899 A | * 2/1986 | May et al. | ..................... 335/18 |
| 6,239,676 B1 | * 5/2001 | Maloney et al. | ................ 335/6 |
| 6,239,962 B1 | 5/2001 | Seymour et al. | |
| 6,259,340 B1 | 7/2001 | Fuhr et al. | |
| 6,278,605 B1 | * 8/2001 | Hill | ............................. 361/600 |

* cited by examiner

Primary Examiner—Lincoln Donovan
(74) Attorney, Agent, or Firm—Cantor Colburn LLP

(57) ABSTRACT

An arc fault circuit breaker assembled such that electrical interconnections, i.e., electrical connections between compartments, are made without disassembling any previously assembled compartment. The arc fault circuit breaker comprises housings having compartments within. Electrically connected components having interconnecting components, i.e., components which provide electrical interconnections between compartments, are disposed within the compartments. The housings are assembled together to enclose the compartments. Interconnecting components within an enclosed compartment extend through openings in the housings to provide electrical interconnections to the next compartment to be assembled. Therefore, no disassembly of the enclosed compartment is necessary to make the interconnections.

21 Claims, 4 Drawing Sheets

ARC FAULT CIRCUIT BREAKER

BACKGROUND OF INVENTION

Arc fault circuit breakers are well known. These breakers comprise contacts that open upon sensing arcing from line to ground, and/or from line to neutral. Arc fault circuit breakers typically use a differential transformer to measure arcing from line to ground. Detecting arcing from line to neutral is accomplished by detecting rapid changes in load current by measuring voltage drop across a relatively constant resistance, usually a bi-metal resistor.

Components of arc fault circuit breakers are generally assembled into separate compartments as defined by their function. More specifically, mechanical components, e.g., load current carrying and switching components, of each pole are assembled into mechanical compartments, while the current sensing components are assembled into an electronics compartment. In order to connect the compartments, the load current of each pole must be routed from the mechanical compartments into the electronics compartment, through appropriate current sensing devices, and back into the mechanical compartments. Additionally sensing lines, e.g., from the bi-metal resistors, must also be routed from the mechanical compartments into the electronics compartment.

Because these circuit breakers sense arc faults, which are essentially short circuits, the connections of the load current carrying components throughout the circuit breaker must be capable of withstanding enormously high surge currents, sometimes in excess of 10,000 amps. The stresses caused by these extremely large surge currents can blow a connection apart that is not manufactured to proper quality standards. This means that during the assembly process, high quality connections, e.g., welds, bolts, or crimps, must be carefully made and inspected in order to survive the extremely high surge currents, and must be completed at a cost and rate that meets the production schedule.

However, in prior art circuit breakers, interconnecting between the various mechanical and electronics compartments, i.e., interconnections, requires partial disassembly of the compartments in order for the production tooling to reach them. This procedure provides very little work space, making it difficult, costly and time-consuming to make the high quality interconnections required.

What is needed is a method and apparatus for routing the main current carrying conductor through the current transformer (C/T) with connections that can be both assembled in a production line environment and will maintain the relatively high circuit currents present during shorting.

SUMMARY OF INVENTION

The above discussed and other drawbacks and deficiencies are overcome or alleviated by an arc fault circuit breaker comprising a plurality of housings having compartments therein. Electrically connected components having interconnecting components, i.e., components which provide electrical interconnections between compartments, are disposed within the compartments. The housings are assembled together to enclose the compartments. Interconnecting components within an enclosed compartment extend through openings in the housings to provide electrical interconnections to the next compartment to be assembled. Therefore, no disassembly of the enclosed compartment is necessary to make the interconnections.

The above discussed and other features and advantages of the present invention will be appreciated and understood by those skilled in the art from the following detailed description and drawings.

BRIEF DESCRIPTION OF DRAWINGS

Referring now to the drawings wherein like elements are numbered alike in the several Figures.

DETAILED DESCRIPTION

Figure 1:
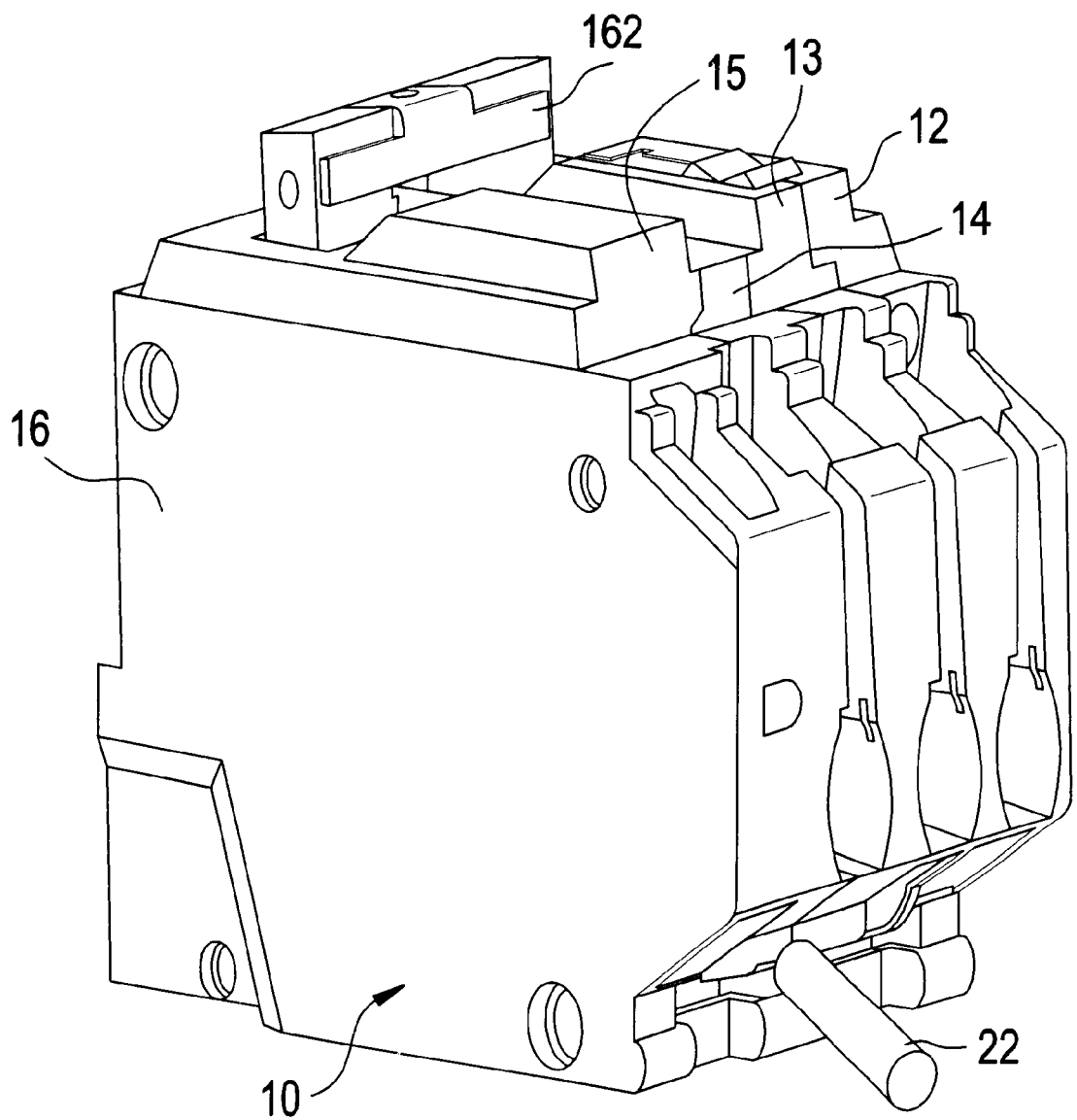
FIG. 1 is a perspective view of a two pole circuit breaker in accordance with an exemplary embodiment.

Referring to FIG. 1, an exemplary embodiment of a fully assembled two pole arc fault circuit breaker is shown generally at 10. Circuit breaker 10 comprises a first housing 12, a second housing 13, a third housing 14, a fourth housing 15 and a cover 16 that are assembled securely together with a plurality of rivets (not shown). First housing 12 defines a mechanical compartment 24, having load current carrying and switching components 25 disposed therein (see FIG. 2). Second housing 13 defines an electronics compartment 58, having current sensing components (not shown) and neutral current carrying components 59 disposed therein (see FIG. 3). A load current from a source (not shown) connects to line connection 36 (see FIG. 2), and conducts along the current carrying and switching components 25 to load lug 18 for customer connection to a load (not shown). A neutral current from the load connects to neutral lug 20 (see FIG. 3), and conducts along the neutral current carrying components 59 to neutral return wire 22 for customer connection to the source. Arc faults are sensed and processed by sensing components known in the art. As more particularly described hereinafter, the arc fault circuit breaker 10 is assembled such that electrical interconnection s, i.e., electrical connections between the mechanical and electronics compartments 24 and 58, are made without disassembling any previously assembled compartment.

Figure 2:
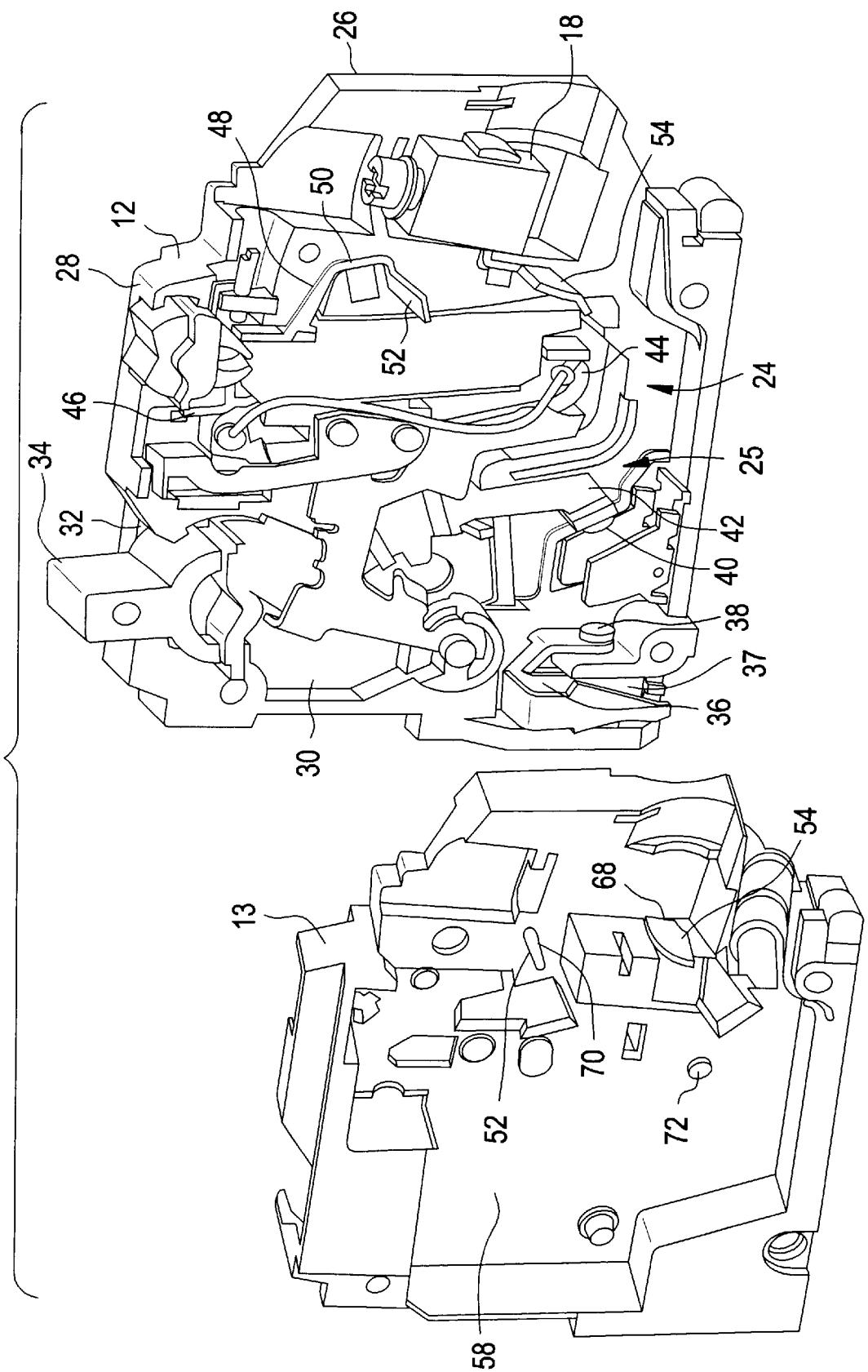
FIG. 2 is an exploded view of the mechanical compartment of a first pole in accordance the embodiment shown in FIG. 1.

Referring to FIG. 2, the mechanical compartment 24 is shown in detail. First housing 12 is generally rectangular in shape, and formed of electrical insulative material, i.e., plastic. First housing 12 comprises first insulative tab 26, first rim 28, and first side wall 30. First tab 26 protrudes forwardly from the front of first housing 12 adjacent load lug 18 to provide an insulative barrier. First rim 28 extends around the periphery of first side wall 30. A first rectangular slot 32 is located in rim 28 at the top and back of first housing 12 and sized to receive pole handle 34. First side wall 30 and first rim 28 define the mechanical compartment 24 which includes the load current carrying and switching components 25 for a first pole. The load current carrying and switching components 25 within the mechanical compartment 24 are electrically connected, e.g., welded, bolted, or crimped, to form a load current path. The load current path begins at line connection 36 where the load current enters the mechanical compartment 24. Line connection 36 includes a stab assembly 37 to connect to a source line (not shown), and a fixed contact 38 which extends downwardly from the upper end of line connection 36. A blade 42 is pivotally engaged to the first housing 12 and pivotally attached to insulated pole handle 34. A lower end of blade 42 includes a flat contact 40 which is forcibly biased against contact 38 to provide electrical continuity for the load current. Pole handle 34 is pivotally attached to first housing 12 and extends outwardly from mechanical compartment 24 towards the electronics compartment 58.

Blade 42 is electrically connected to a bottom distal end of bimetal resistor 46 via braid 44. A top distal end of bimetal resistor 46 is in turn electrically connected to L-shaped strap 48. L-shaped strap 48 comprises a substantially vertical portion strap body 50 and a substantially horizontal portion strap extension 52. Horizontal strap extension 52 forms a substantially right angle with vertical strap body 50, and extends outwardly from mechanical compartment 24 into electronics compartment 58. Load terminal 54 also extends outwardly from the mechanical compartment 24 into electronics compartment 58. Load terminal 54 is in turn electrically connected to the load lug 18. The load current path conducts the load current from the line connection 36, through contacts 38 and 40, through blade 42, braid 44, bimetal resistor 46, and L-shaped strap 48. At this point, the load current path passes out of the mechanical compartment 24 through horizontal strap extension 52. The load current path returns to the mechanical compartment 24 through load terminal 54 and out through the load lug 18 to the load. When an arc fault is detected the pole handle 34 pivots clockwise, which in turn pivots blade 42 to separate contacts 38 and 40 and thereby open the load current path.

A pair of conductors (not shown) is electrically connected to the bottom distal end of bimetal resistor 46 and horizontal strap extension 52 of the L-shaped strap 48 to sense arcing from the line to neutral as is well known. This is accomplished by measuring the voltage drop across the bimetal resistor 46 that results from rapid changes in load current caused by arcing from line to neutral.

Figure 3:
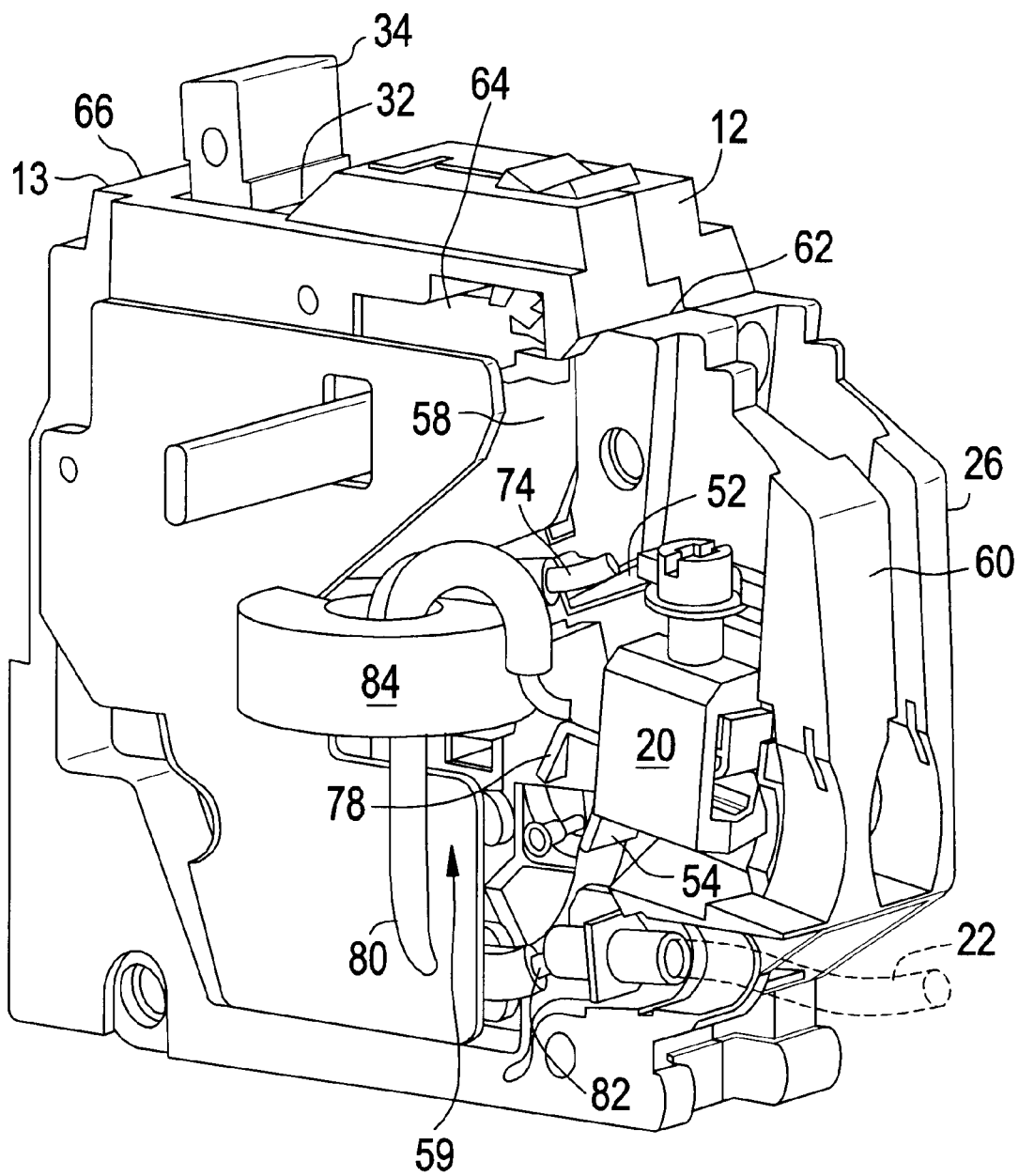
FIG. 3 is an exploded view of the electronics compartment of the two pole circuit breaker of FIG. 1.

Referring to FIG. 3, the electronics compartment 58 is shown in detail. Second housing 13 is generally rectangular in shape and formed of electrical insulative material, i.e., plastic. Second housing 13 comprises second insulative tab 60, second rim 62, and second side wall 64. Second tab 60 protrudes forwardly from the front of second housing 13 adjacent neutral lug 20 to provide an insulative barrier. Second rim 62 extends around the periphery of second side wall 64. A second rectangular slot 66 is located in rim 62 and cooperates with slot 32 to receive and secure pole handle 34 when housings 12 and 13 are assembled together. Second side wall 64 and second rim 62 define the electronics compartment 58 which includes the current sensing components and the neutral current carrying components 59. Second housing 13 is assembled securely against first housing 12 with a plurality of rivets (not shown) to enclose mechanical compartment 24 and to capture the components within, as well as to insulate and secure load lug 18 between tabs 26 and 60.

Second side wall 64 of second housing 14 includes rectangular through holes 68 and 70 and circular through hole 72 (see FIG. 2) to provide openings in the second housing 13 to permit the load terminal 54, horizontal strap extension 52, and pair of conductors (not shown) to extend through to the electronics compartment 58. This enables all electrical interconnections between compartments 24 and 58 to be completed in electronics compartment 58. During production, this allows compartments 24 and 58 to be assembled sequentially without the need to disassemble mechanical compartment 24. That is, mechanical compartment 24 is assembled first with the interconnecting components 52 and 54 extending outwardly from the compartment 24. Second housing 13 is then assembled to first housing 12 enclosing the mechanical compartment 24, but allowing the interconnecting components 52 and 54 to extend therethrough. The electronics compartment 58 may then be assembled and the associated components be interconnected to the components of the mechanical compartment 24 without any disassembly of mechanical compartment 24. This provides for a large work space for tooling and assembly when interconnecting the components of the compartments 24 and 58. Therefore, high quality interconnections are more consistently, and cost effectively made than in prior art circuit breakers.

Current sensing components include a circuit board which is electrically connected to a solenoid (not shown), a current sensing transformer 84, and an optional current sensing transformer. Upon receiving signals indicative of an arc fault, the circuit board generates a trip signal to trip the arc fault circuit breaker 10.

The solenoid comprises a trip rod (not shown) for engaging or pivoting the pole handle 34 in response to the trip signal, and provides the means to trip the circuit breaker 10 under arc fault conditions. That is, when an arc fault is sensed, the circuit board generates a trip signal to actuate the solenoid, which extends the trip rod to engage pole handle 34. The pole handle 34 pivots, which in turn pivots blade 42 to operate contacts 38 and 40 and thereby open the load current path.

A pair of conductors is electrically interconnected to the circuit board. The circuit board senses the voltage across the bi-metal resistor 46 and generates a trip signal to actuate the solenoid in response to a rapid voltage drop indicative of arcing across the line and neutral leads.

The load current path is completed by electrically interconnecting strap extension 52 and load terminal 54 to the respective distal ends of wire connector 74. Combination of electrically interconnecting strap extension 52 and load terminal 54 becomes a first interconnecting component of the plurality of components in mechanical compartment 24 that extends into electronics compartment 58 providing electrical interconnection with the neutral carrying components 59 in electronics compartment 58. Wire connector 74 can be formed from various suitable conductive materials, e.g., insulated wire, rectangular formed magnetic wire, square formed magnetic wire, or insulated sleeve covered braided copper. Wire connector 74 is routed through a center of sensing transformer 84 such that the flow of the load current through the center of transformer 84 is in a known direction.

The neutral current carrying components 59 within the electronics compartment 58 are electrically connected, e.g., welded, bolted, or crimped, to form a neutral current path for the neutral current. The neutral current path begins at neutral lug 20 where the neutral current enters the electronics compartment 58. Neutral lug 20 secures the neutral lead connected to the load against neutral terminal 78 to provide electrical continuity thereto. Neutral terminal 78 is electrically connected to neutral return wire 22 via copper braid 82. An insulated sleeve 80 surrounds copper braid 82 and provides electrical insulation between copper braid 82 and current transformer 84 and wire connector 74. Copper braid 82 is routed through the center of sensing transformer 84 such that the flow of the neutral current through the center of transformer 84 is in the opposite direction of the flow of the load current through lead 74.

Both the copper braid 82 of the neutral current path, and wire connector 74 of the load current path are routed through the current sensing transformer 84 to sense arcing from line to ground as is well known. This is accomplished by routing the flow of the neutral current through the sensing transformer 84 in the opposite direction to the flow of the load current. The total current flow through sensing transformer 84 thus cancels unless an external ground fault current is caused by arcing from line to ground. The resulting differential signal, sensed by sensing transformer 84, is indicative of the ground fault current and is processed by the circuit board.

An optional current sensing transformer is used for ground fault applications where a separate sensor is needed to detect improper wiring by the customer, e.g., the neutral current path is wired backwards. That is, the copper braid 82 of the neutral current path is routed through the optional current sensing transformer. The resulting signal, sensed by optional current sensing transformer, is indicative of the neutral current direction and magnitude, and is processed by the circuit board.

Figure 4:
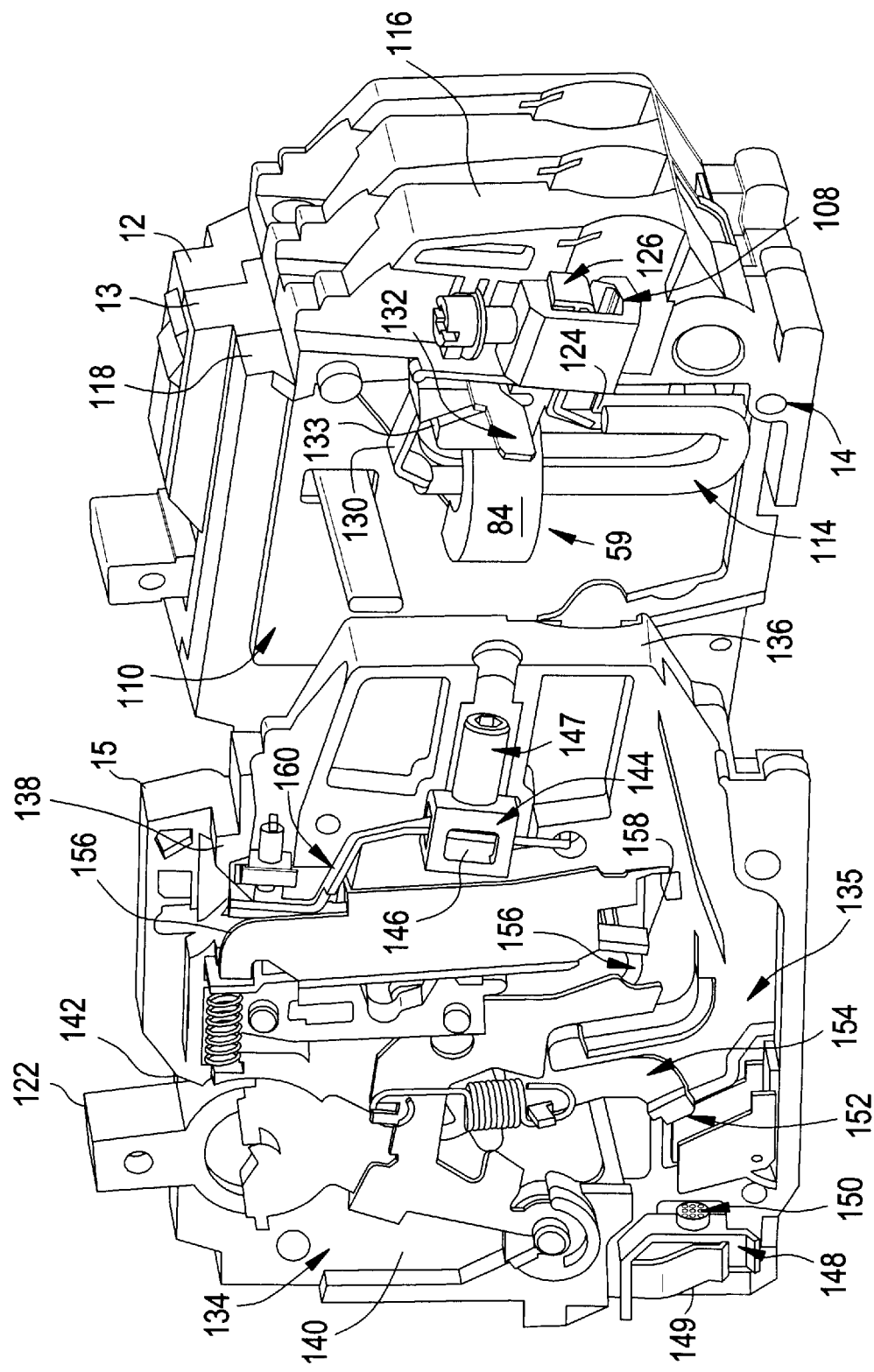
FIG. 4 is an exploded view of the two pole circuit breaker of FIG. 3 showing a third housing attached and a fourth housing showing the mechanical compartment of a second pole.

Referring to FIG. 4, circuit breaker 10 is depicted with first housing 12, second housing 13, and third housing 14 assembled securely together while fourth housing 15 is shown having the second pole components of two pole circuit breaker 10. The first housing 12 defines the mechanical compartment 24 having the load current carrying and switching components 25 disposed therein (see FIG. 2). The second housing 13 and third housing 14 define a third compartment 110 having first and second pole current sensing components and neutral current carrying components 59 partially disposed therein. Fourth housing 15 defines a second pole mechanical compartment 134 having second load current carrying and switching components disposed therein shown generally at 135. A first and a second load current from a source (not shown) connects to line connections 36 and 148 respectively (see FIGS. 2 and 4), and conducts along load current carrying and switching components 25 and 135 to load lugs 18 and 108 for customer connection to a first and second loads (not shown). A neutral current, common to both first and second loads, connects to neutral lug 20, and conducts along the neutral current carrying components 59 to neutral return wire 22 for customer connection to the source (see FIG. 3). Arc faults are sensed and processed by first and second pole current sensing components. As more particularly described hereinafter, the arc fault circuit breaker 10 is assembled such that electrical interconnections, i.e., electrical connections between mechanical compartments 24 and 134 and electronics compartment 58, are made without disassembling any previously assembled compartment.

Still referring to FIG. 4, third housing 14 is generally rectangular in shape and formed of electrical insulative material, i.e., plastic. Third housing 14 comprises third insulative tab 116, and third rim 118. Third insulative tab 116 protrudes forwardly from the front of third housing 14 adjacent second load lug 108 to provide an insulative barrier. Third rim 118 extends around a border of third housing 14. Third rim 118 of third housing 102 assembles securely against second rim 62 of second housing 14 extending electronics compartment 58 outwardly to accommodate the first and second pole current sensing components. Third rim 118, second rim 62, and second side wall 64 define the third compartment.

First and second pole current sensing components comprise circuitry (not shown) used to link signals for processing. Additionally, the circuit board is electrically connected to the solenoid, current sensing transformer 84 and an optional current sensing transformer. Upon receiving signals indicative of an arc fault, the circuit board generates a trip signal to trip the arc fault circuit breaker 10.

Another pair of conductors is electrically interconnected to the circuit board as previously discussed in the first pole assembly of circuit breaker 10. The pair of conductors for the second pole is electrically connected to the circuit board. The circuit board senses the voltage across a bi-metal resistor 158 for the second pole and generates a trip signal to actuate the solenoid in response to a rapid voltage drop indicative of arcing across the line and neutral leads.

A second load current path for the second load current is partially formed by electrically connecting a second wire connector 124 to a second load terminal 126, which is in turn is connected to the second load lug 108. Second wire connector 124 is also encased in an insulative sleeve 114 such that the flow of the second load current through the center of transformer 84 is in a direction opposite to the flow of the neutral current through the center of the transformer 114. In this exemplary embodiment of the invention, the second load lug 108 is located in the third compartment 110 as will be discussed hereinafter. The distal end of wire connector 124 is connected to a strap terminal 130. Distal end of wire connector 124 is welded to one end of strap terminal 130. Strap terminal 130 is configured having an opposite end 132 to distal end extending from third compartment 110 into mechanical compartment 134 substantially perpendicular to side wall 140. Third housing 14 is configured within electronics compartment 58 with a slot 133 to retain an intermediate portion of strap terminal 130.

First wire connector 74 of the first load current path and second wire connector 124 of the second load current path are routed through the inside diameter of their respective sleeves of the neutral current path. Wire conductor having sleeve 114 is in turn routed through the center of current sensing transformer 84 to sense arcing from line to ground as is well known. This is accomplished by routing the flow of the neutral current through the sensing transformer 84 in the opposite direction to the flow of the combined first load and second load currents. The total current flow through sensing transformer 84 thus cancels unless an external ground fault current is caused by arcing from line to ground. The resulting differential signal, sensed by sensing transformer 84, is indicative of the ground fault current and is processed by circuit board 76.

Still referring to FIG. 4, the second pole mechanical compartment 134 is shown in detail. Fourth housing 15 is generally rectangular in shape and formed of electrical insulative material, i.e., plastic. Fourth housing 15 comprises fourth insulative tab 136, fourth rim 138, and fourth side wall 140. Fourth tab 136 protrudes forwardly from the front of fourth housing 15 adjacent load lug 108 to provide an insulative barrier. Fourth rim 138 extends around the periphery of fourth side wall 140. A fourth rectangular slot 142 is located in rim 138 to receive and secure second pole handle 122 when housings 15 and 14 are assembled together. Fourth side wall 140 and fourth rim 138 define the second mechanical compartment 134 which includes the second load current carrying and switching components 135. The fourth housing 15 is assembled securely against third housing 14 with a plurality of rivets (not shown) to enclose third compartment 110 and to capture the components within third compartment 110, as well as to insulate and secure second load lug 108 between tabs 136 and 116.

Fourth side wall 140 includes circular through holes or slots (not shown) to provide openings in the fourth housing 15 to permit the second pair of conductors 128, to extend through to the mechanical compartment 134. In addition, fourth side wall 140 is configured to retain a receiving terminal 144. Receiving terminal 144 includes apertures 146 on four peripheral sides for receiving strap terminal 130 and second strap 160. Receiving terminal 144 further includes a threaded screw 147 for electrically connecting second strap 160 with strap terminal 130 against an inside wall of receiving terminal 144. Rim 136 is configured providing access to threaded screw 147 for securing strap terminal with second terminal 160 within receiving terminal 144. This enables all electrical interconnections between compartments 58 and 134 to be connected in mechanical compartment 134. During production, this allows compartments 58 and 134 to be assembled sequentially without the need to disassemble third compartment 110. This provides for a larger work space for tooling, e.g., welding equipment, than in prior art circuit breakers when interconnecting the components of the compartments 110 and 134. Therefore, higher quality interconnections are more consistently, and cost effectively made.

The second load current carrying and switching components 135 within the second mechanical compartment 134 are electrically connected to form a second load current path. The second load current path begins at line connection 148 where the second load current enters the second mechanical compartment 134. Line connection 148 includes a second stab assembly 149 to connect to a source line (not shown), and a fixed contact 150 which extends downwardly from the upper end of line connection 148. Blade 154 is pivotally engaged to the fourth housing 15 and pivotally attached to insulated second pole handle 122. A lower end of blade 154 includes a flat contact 152 which is forcibly biased against contact 150 to provide electrical continuity for the second load current. Second pole handle 122 is pivotally attached to fourth housing 15 and extends from mechanical compartment 134 into the third compartment 110. A handle tie 162 connects the two individual pole handles 122 and 34 together (see FIG. 1).

Blade 154 is electrically connected to a bottom distal end of bimetal resistor 158 via braid 156. A top distal end of bimetal resistor 158 is in turn electrically connected to second strap 160. Second strap 160 is electrically interconnected to receiving terminal 144. The second load current path conducts the second load current from the line connection 148 through contacts 150 and 152, through blade 154, braid 156, bimetal resistor 158, strap 160, and receiving terminal 144. At this point, the second load current path passes out of the second mechanical compartment 134 to wire connector 124 via strap terminal 130 which is routed into the third compartment 110 through an aperture through side wall 140 aligned with a complimentary aperture in receiving terminal 144. The second load current path then conducts the second load current through second wire connector 124, second load terminal 126, and out through the second load lug 108 to the load. When an arc fault is detected the pole handle 122 pivots clockwise, which in turn pivots blade 154 to separate contacts 150 and 152 and thereby open the second load current path.

In this exemplary embodiment, because the second load lug 108 is located in the third compartment 110 rather than mechanical compartment 134, the only load current carrying interconnection within the second mechanical compartment 134 is between the second strap 160 and the receiving terminal 144 before engagement with strap terminal 130 on final assembly. Using strap terminal 130 between for electrically interconnecting strap terminal 130 with load terminal 108, strap terminal 130 is a second interconnecting component of the plurality of components in third compartment 110 that extends into and aligned with second mechanical compartment 134 providing electrical interconnection with the neutral carrying components 59 in third compartment 110. In addition, there is no longer a need to provide room in the second mechanical compartment 134 for tooling required to weld strap 160 and wire connector 124 together. Therefore, the assembly process is simplified.

The second pair of conductors (not shown) is electrically interconnected to the bottom distal end of bimetal resistor 158 and second strap 160 to sense arcing from line to neutral as is well known. This is accomplished by measuring the voltage drop across the bimetal resistor 158 that results from rapid changes in load current caused by arcing from line to neutral. The pair of conductors is electrically connected to the circuit board for signal processing, as previously discussed.

When an arc fault is sensed, the circuit board generates a trip signal to actuate the solenoid, which extends to the trip rod or trip latch to engage pole handle 34. Because pole handles 34 and 122 are tied together via handle tie 162, both the pole handles 34 and 122 pivot, which in turn pivots blades 42 and 154 respectively. Therefore contacts 38 and 40 in the mechanical compartment 24, and contacts 150 and 154 in the second mechanical compartment 134 operate simultaneously to open the first and second load current paths respectively.

It will be appreciated by one skilled in the art that although an exemplary embodiment of the two pole 10 circuit breaker is described herein, that it is contemplated that a strap terminal 130 connection could be used in a single pole circuit breaker when connecting the electrical compartment 58 with the mechanical compartment during final assembly. In addition, the mechanical compartments 24, 134 and housings 12,13 and 14, 15 are common to both. This feature enables each mechanical compartment 24,134 to be assembled as a separate subassembly. This allows for subassembly calibration and testing of each mechanical compartment 24, 134. Additionally, it provides for greater economies of scale, as well as a significant reduction in tooling.

The above described exemplary embodiments provide reliable main current connections easily manufactured with low labor cost. The method and apparatus disclosed herein allows a first and second breaker to be produced separately and calibrated so that only completed fully functional breakers are provided to final assembly with the electronics, thus increasing reliability and reducing scrap and rework costs.

In addition if rework is required it provides a non-destructive method of disassembly further reducing rework costs. This disclosure covers a means of interconnection such that the second circuit breaker module of two circuit breaker modules uses a plug-in bolted connection. This feature allows modular assembly such that the last operation is in plugging in the second ircuit breaker module and tightening a screw to secure the current carrying conductor of the second module before riveting the modules together. If any malfunction in the electronic circuit occurs the breaker can be disassembled without damage and repaired before riveting. The problem solved by the bolted joint is one of interconnection between the final second pole circuit breaker and the electronics mid section. The joint provides a means of assembly that allows all the interconnections to be made with the electronics compartment open with the last connection being that of plugging in the second breaker module and tightening a set screw.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A circuit breaker comprising:

a first housing defining an open first compartment;

a second housing defining an open second compartment, and having a first opening configured therein to align with said open first compartment, said second housing assembled to said first housing to substantially enclose said first compartment;

a first plurality of electrically connected components disposed within said first compartment, said first plurality of electrically connected components including a first interconnecting component extending into said second compartment through said first opening;

a second plurality of electrically connected components disposed within said second compartment, said first interconnecting component providing electrical interconnection to said second plurality of components within said second compartment;

a third housing defining an open third compartment, and having a second opening configured therein to align with said open second compartment, said third housing assembled to said second housing to substantially enclose said second compartment;

a third plurality of electrically connected components disposed within said third compartment, said third plurality of components including a second interconnecting component providing electrical interconnection to said second plurality of components and to one component of said third plurality of components in said third compartment;

a fourth housing defining an open fourth compartment, and having a third opening configured therein to align with said open third compartment, said fourth housing assembled to said third housing to substantially enclose said third compartment;

a fourth plurality of electrically connected components disposed within said fourth compartment; and said second interconnecting component of said third plurality of components having one end extending into said fourth compartment through said third opening, said second interconnecting component providing electrical interconnection to said fourth plurality of components within said fourth compartment.

2. The circuit breaker of claim 1 wherein said circuit breaker is an arc fault circuit breaker.

3. The circuit breaker of claim 1 wherein said circuit breaker is a two pole arc fault circuit breaker.

4. The circuit breaker of claim 1 wherein said second interconnecting component comprises a second load current carrying component.

5. The circuit breaker of claim 2 wherein said fourth plurality of components includes a bi-metal resistor.

6. The circuit breaker of claim 1 wherein said first housing, said second housing, and said first plurality of components further comprise a separate subassembly.

7. The circuit breaker of claim 1 wherein said fourth housing and said fourth plurality of components further comprise a separate subassembly.

8. The circuit breaker of claim 6 wherein said first plurality of components includes a bi-metal resistor.

9. The circuit breaker of claim 6 wherein said first plurality of components includes a load lug.

10. The circuit breaker of claim 6 wherein said second plurality of components include a current sensing transformer.

11. The circuit breaker of claim 1 wherein said second plurality of components include a neutral lug.

12. The circuit breaker of claim 11 wherein said second plurality of components include an electrical connection in said second compartment between said neutral lug and a neutral line.

13. The circuit breaker of claim 11 wherein said one component of said third plurality of components includes a load lug.

14. The circuit breaker of claim 1 wherein said electrical interconnection to said second plurality of components comprises a weld, bolt or crimp.

15. The circuit breaker of claim 1 wherein said electrical interconnection to said one component of said third plurality of components comprises a weld, bolt or crimp.

16. The circuit breaker of claim 1 wherein said electrical interconnection to said one end of said second interconnecting component of said third plurality of components comprises reception within a terminal and a bolt in said fourth compartment.

17. The circuit breaker of claim 1 wherein said third housing is configured to receive said an intermediate portion of said second interconnecting component.

18. The circuit breaker of claim 17 wherein said third housing is configured to align said one end of said second interconnecting component with a terminal in said fourth compartment.

19. The circuit breaker of claim 18 wherein said one end of said second interconnecting component is received in said terminal and retained with a bolt.

20. The circuit breaker of claim 19 wherein said bolt is accessible from outside of said fourth housing.

21. The circuit breaker of claim 18 wherein said terminal is further electrically engaged with one end of a bi-metal resistor in said fourth compartment.

* * * * *